(12) United States Patent
Abuelsaad et al.

(10) Patent No.: US 10,255,710 B2
(45) Date of Patent: *Apr. 9, 2019

(54) AUDIO MEDIA MOOD VISUALIZATION

(71) Applicant: International Business Machines Corporation, Armonk, NY (US)

(72) Inventors: Tamer E. Abuelsaad, Poughkeepsie, NY (US); John E. Moore, Jr., Brownsburg, IN (US); Rajeshkumar N. Singi, Marietta, GA (US); Robert R. Wentworth, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,802

(22) Filed: Mar. 14, 2018

(65) Prior Publication Data

US 2018/0204367 A1 Jul. 19, 2018

Related U.S. Application Data

(63) Continuation of application No. 14/856,904, filed on Sep. 17, 2015, now Pat. No. 9,953,451, which is a
(Continued)

(51) Int. Cl.
| | |
|---|---|
| *G06T 13/20* | (2011.01) |
| *G06F 3/16* | (2006.01) |
| *G06F 17/30* | (2006.01) |

(52) U.S. Cl.
CPC .......... *G06T 13/205* (2013.01); *G06F 3/165* (2013.01); *G06F 17/30026* (2013.01)

(58) Field of Classification Search
CPC .. G06F 17/30026; G06F 3/165; G06T 13/205
(Continued)

(56) References Cited

U.S. PATENT DOCUMENTS

| | | |
|---|---|---|
| 5,265,248 A | 11/1993 | Moulios et al. |
| 5,616,876 A | 4/1997 | Cluts |

(Continued)

FOREIGN PATENT DOCUMENTS

| | | |
|---|---|---|
| JP | 92010140278 | 6/2010 |
| WO | 2010105396 | 9/2010 |

OTHER PUBLICATIONS

Amendment filed Jun. 25, 2015 in response to Office Action (dated May 22, 2015) for U.S. Appl. No. 14/596,494, filed Jan. 14, 2015.
(Continued)

*Primary Examiner* — Md S Elahee
(74) *Attorney, Agent, or Firm* — Schmeiser, Olsen & Watts; Michael A. Petrocelli

(57) ABSTRACT

An audio media visualization method and system. The method includes receiving by a computing processor, mood description data describing different human emotions/moods. The computer processor an audio file comprising audio data and generates a mood descriptor file comprising portions of the audio data associated with specified descriptions of the mood description data. The computer processor receives a mood tag library file comprising mood tags mapped to animated and/or still objects representing various emotions/moods and associates each animated and/or still object with an associated description. The computer processor synchronizes the animated and/or still objects with the portions of said audio data and presents the animated and/or still objects synchronized with the portions of said audio data.

20 Claims, 6 Drawing Sheets

Related U.S. Application Data continuation of application No. 14/596,494, filed on Jan. 14, 2015, now Pat. No. 9,235,918, which is a continuation of application No. 13/153,751, filed on Jun. 6, 2011, now Pat. No. 8,948,893.

(58) Field of Classification Search
USPC .......................................................... 700/94
See application file for complete search history.

(56) References Cited

U.S. PATENT DOCUMENTS

| | | |
|---|---|---|
| 6,795,808 B1 | 9/2004 | Strubbe et al. |
| 7,102,643 B2 | 9/2006 | Moore et al. |
| 7,257,538 B2 | 8/2007 | Qian |
| 7,372,536 B2 | 5/2008 | Shah et al. |
| 7,396,990 B2 | 7/2008 | Lu et al. |
| 7,400,351 B2 | 7/2008 | Zhang et al. |
| 7,921,067 B2 | 4/2011 | Kemp et al. |
| 8,126,220 B2 | 2/2012 | Greig |
| 8,443,290 B2 | 5/2013 | Bill |
| 8,948,893 B2 | 2/2015 | Abuelsaad et al. |
| 9,235,918 B2 | 1/2016 | Abuelsaad et al. |
| 2002/0018074 A1 | 2/2002 | Buil et al. |
| 2002/0147628 A1 | 10/2002 | Specter et al. |
| 2003/0035412 A1 | 2/2003 | Wang et al. |
| 2005/0158037 A1 | 7/2005 | Okabayashi et al. |
| 2007/0088727 A1 | 4/2007 | Kindig |
| 2007/0157795 A1 | 7/2007 | Hung |
| 2007/0256545 A1 | 11/2007 | Lee et al. |
| 2007/0277092 A1 | 11/2007 | Basson et al. |
| 2008/0110322 A1 | 5/2008 | Lee et al. |
| 2008/0158334 A1 | 7/2008 | Reponen et al. |
| 2008/0163074 A1 | 7/2008 | Tu |
| 2009/0116684 A1 | 5/2009 | Andreasson |
| 2009/0278851 A1 | 11/2009 | Ach et al. |
| 2010/0191733 A1 | 7/2010 | Park et al. |
| 2010/0325135 A1 | 12/2010 | Chen et al. |
| 2011/0007142 A1 | 1/2011 | Perez et al. |
| 2011/0029112 A1 | 2/2011 | Kemp et al. |
| 2011/0100199 A1 | 5/2011 | Sugimoto et al. |
| 2011/0239137 A1 | 9/2011 | Bill |
| 2012/0310392 A1 | 12/2012 | Abuelsaad et al. |
| 2015/0127129 A1 | 5/2015 | Abuelsaad et al. |
| 2016/0004500 A1 | 1/2016 | Abuelsaad et al. |

OTHER PUBLICATIONS

Amendment filed Sep. 12, 2014 in response to Office Action (dated Jun. 18, 2014) for U.S. Appl. No. 13/153,751, filed Jun. 6, 2011.
Laurier et al.; Mood Cloud: A Real-Time Music Mood Visualization Tool; CMMR, Computer Music Modeling and Retrieval 5th International Symposium; May 19-23, 2008; 5 pages.
Notice of Allowance (dated Jul. 17, 2015) for U.S. Appl. No. 14/596,494, filed Jan. 14, 2015.
Notice of Allowance (dated Sep. 29, 2014) for U.S. Appl. No. 13/153,751, filed Jun. 6, 2011.
Office Action (dated Jun. 18, 2014) for U.S. Appl. No. 13/153,751, filed Jun. 6, 2011.
Office Action (dated May 22, 2015) for U.S. Appl. No. 14/596,494, filed Jan. 14, 2015.
Office Action (dated Aug. 10, 2017) for U.S. Appl. No. 14/856,904, filed Sep. 17, 2015.
Amendment filed Nov. 7, 2017 in response to Office Action (dated Aug. 10, 2017) for U.S. Appl. No. 14/856,904, filed Sep. 17, 2015.
Notice of Allowance (dated Dec. 18, 2017) for U.S. Appl. No. 14/856,904, filed Sep. 17, 2015.

AUDIO MEDIA MOOD VISUALIZATION

CROSS REFERENCE TO RELATED APPLICATIONS

This application is a continuation application claiming priority to Ser. No. 14/856,904 filed Sep. 17, 2015, now U.S. Pat. No. 9,953,451, issued Apr. 24, 2018, which is a continuation application claiming priority to Ser. No. 14/596,494 filed Jan. 14, 2015 now U.S. Pat. No. 9,235,918 issued Jan. 12, 2016 which is a continuation application claiming priority to Ser. No. 13/153,751 filed Jun. 6, 2011, now U.S. Pat. No. 8,948,893 issued Feb. 3, 2014.

FIELD

The present invention relates to a method and associated system for providing visual mood based annotations for audio media.

BACKGROUND

Describing data typically comprises an inaccurate process with little flexibility. Data description within a system typically includes a manual process. Manually describing data may be time consuming and require a large amount of resources. Accordingly, there exists a need in the art to overcome at least some of the deficiencies and limitations described herein above.

SUMMARY

The present invention provides a method comprising: receiving, by a computer processor of a computing apparatus, mood description data describing different human emotions/moods; receiving, by the computer processor, an audio file comprising audio data presented by an author; generating, by the computer processor, a mood descriptor file comprising portions of the audio data associated with specified descriptions of the mood description data; receiving, by the computer processor, a mood tag library file comprising mood tags describing and mapped to animated and/or still objects representing various emotions/moods; associating, by the computer processor based on the mood tags, each animated and/or still object of the animated and/or still objects with an associated description of the specified descriptions; synchronizing, by the computer processor, the animated and/or still objects with the portions of the audio data associated with the specified descriptions; and first presenting, by the computer processor to a listener, the animated and/or still objects synchronized with the portions of the audio data associated with the specified descriptions.

The present invention provides a computing system comprising a computer processor coupled to a computer-readable memory unit, the memory unit comprising instructions that when executed by the computer processor implements a method comprising: receiving, by the computer processor of a computing apparatus, mood description data describing different human emotions/moods; receiving, by the computer processor, an audio file comprising audio data presented by an author; generating, by the computer processor, a mood descriptor file comprising portions of the audio data associated with specified descriptions of the mood description data; receiving, by the computer processor, a mood tag library file comprising mood tags describing and mapped to animated and/or still objects representing various emotions/moods; associating, by the computer processor based on the mood tags, each animated and/or still object of the animated and/or still objects with an associated description of the specified descriptions; synchronizing, by the computer processor, the animated and/or still objects with the portions of the audio data associated with the specified descriptions; and first presenting, by the computer processor to a listener, the animated and/or still objects synchronized with the portions of the audio data associated with the specified descriptions.

The present invention provides a computer program product, comprising a computer readable storage device storing a computer readable program code, the computer readable program code comprising an algorithm that when executed by a computer processor of a computing system implements a method, said method comprising: receiving, by the computer processor of a computing apparatus, mood description data describing different human emotions/moods; receiving, by the computer processor, an audio file comprising audio data presented by an author; generating, by the computer processor, a mood descriptor file comprising portions of the audio data associated with specified descriptions of the mood description data; receiving, by the computer processor, a mood tag library file comprising mood tags describing and mapped to animated and/or still objects representing various emotions/moods; associating, by the computer processor based on the mood tags, each animated and/or still object of the animated and/or still objects with an associated description of the specified descriptions; synchronizing, by the computer processor, the animated and/or still objects with the portions of the audio data associated with the specified descriptions; and first presenting, by the computer processor to a listener, the animated and/or still objects synchronized with the portions of the audio data associated with the specified descriptions.

The present invention advantageously provides a simple method and associated system capable of describing data.

DETAILED DESCRIPTION

Figure 1:
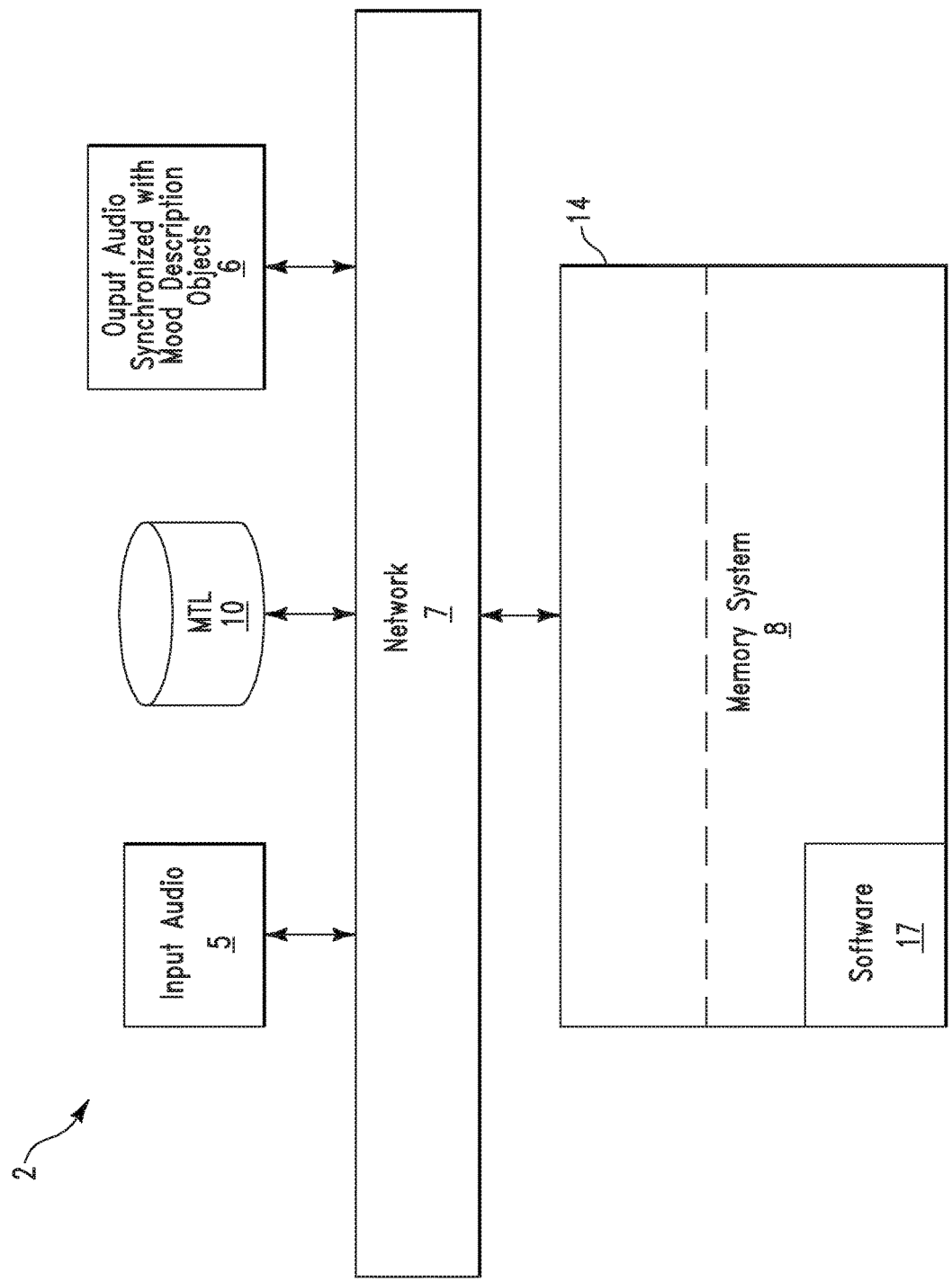
FIG. 1 illustrates a system for providing mood based annotations for audio media, in accordance with embodiments of the present invention.

FIG. 1 illustrates a system 2 for providing mood based annotations for audio media, in accordance with embodiments of the present invention. System 2 synchronizes mood based video annotations (e.g., still or animated video images) with audio segments (of an audio file) based on a mood of a speaker of the audio file. The synchronized result (i.e., the video annotations and audio segments) is presented to a listener to capture the attention of the listener. System 2 provides the following functionality:

1. Determining a mood of a speaker (in an audio file) based on an analysis of speech presented by the speaker (e.g. by detecting inflection points in the speaker's voice or the speaker's gestures).
2. Tagging an audio file with video mood annotations (manually or automatically) based on a determination of a mood of a speaker (in an audio file).
3. Providing visualization of speech within an audio file based on mood description objects (e.g., mood annotations such as, inter alia, animated video images, still images, etc.) associated with the speech.

System 2 of FIG. 1 comprises input audio files 5, a mood tag library 10, and output audio files synchronized with mood description objects 6 connected through a network 7 to a computing system 14. Alternatively, input audio files 5, mood tag library 10, and output audio files synchronized with mood description objects 6 may be directly connected to computing system 14 (i.e., without network 7). Network 7 may comprise any type of network including, inter alia, a telephone network, a local area network, (LAN), a wide area network (WAN), the Internet, a wireless network, etc. Computing system 14 may comprise any type of computing system(s) including, inter alia, a computer (PC), an audio recording device, etc. Computing system 14 comprises a memory system 8. Memory system 8 may comprise a single memory system. Alternatively, memory system 8 may comprise a plurality of memory systems. Memory system 8 comprises a software application 17 for providing visualization of moods associated with speech within an audio file.

System 2 enables a process for automatically or manually generating mood based annotations for audio media that is utilized to automatically generate and present (to a listener) visual media (synchronized with the audio media) representing a speaker's mood in order to keep the attention of the listener. An author of the audio media may control placement of the mood based annotations to be coupled with the audio media. Alternatively, a listener (of the audio media) may control placement of the mood based annotations to be coupled with the audio media. Computing system 14 receives input audio (i.e., speech data) from input audio files 5 and associates mood descriptions (i.e., tags describing various human emotions/moods) with portions of the input audio. The mood descriptions are associated with the mood based annotations (e.g., mood description objects) retrieved from a mood tag library 10. Software application 17 generates and presents (to a listener) a synchronized file 6 comprising the audio (i.e., the input audio) synchronized with the associated mood based annotations. The following examples describe various scenarios for generating audio files synchronized with mood based annotations:

EXAMPLE 1

System 2 provides the ability for an audio content author to manually inject moods (to be presented to a listener) in real time while he/she is recording the audio. For example, the input audio may be received from an author (of the input audio) via a recording device and the mood descriptions may be associated (by the author) with the input audio in real time as the input audio is being recorded (as the author speaks). In this scenario, software application 17 assigns the different mood descriptions (i.e., different mood descriptor tags) to the associated portions of the input audio (automatically based on a software analysis or manually based on commands from the author) at specified time frames (in the audio file) resulting in the generation of a mood descriptor file. The mood descriptions are associated with the mood based annotations (e.g., mood description objects such as still or animated video images) retrieved from a mood tag library 10. Software application generates and presents (to a listener) a synchronized file 6 comprising the audio (i.e., the input audio) synchronized with the associated mood based annotations.

EXAMPLE 2

System 2 provides the ability to annotate audio after an audio recording has been completed. An annotation process produces a set of tags that act as descriptors associated with the mood of an author of the audio. Annotations may span intervals in the audio recording or be placed at specified points along the audio recording. For example, the input audio may be fully received from an author (of the input audio) via a recording device and the mood descriptions may be associated (by the author) with the input audio after the input audio has been recorded. In this scenario, the author manually assigns the different mood descriptions (i.e., different mood descriptor tags) to the associated portions of the input audio at specified time frames (in the audio file) resulting in the generation of a mood descriptor file. The mood descriptions are associated with the mood based annotations (e.g., mood description objects such as still or animated video images) retrieved from a mood tag library 10. Software application generates and presents (to a listener) a synchronized file 6 comprising the audio (i.e., the input audio) synchronized with the associated mood based annotations.

EXAMPLE 3

System 2 provides the ability to produce a descriptor of moods (of the author of the audio) based on an automated examination of the audio (e.g., analysis of audio inflection points). For example, software application may sense (by sensing voice inflections) that the author is very excited thereby generating an emotion descriptor that describes rapid hand movement or extreme engagement of hand gestures. In this scenario, input audio may be received from an author (of the input audio) via a recording device and voice inflection points (of the author's voice) are detected and analyzed (by software application 17). The voice inflections may be analyzed by, inter alia, comparing the voice inflections to a predefined table or file describing different voice inflections for individuals including the author of the audio. Based on the analysis, the mood descriptions are automatically associated (by software application 17) with associated portions of the input audio at specified time frames resulting in the generation of a mood descriptor file. The mood descriptions are associated with the mood based annotations (e.g., mood description objects such as, inter alia, still or animated video images of rapid hand movement, extreme engagement of hand gestures, an animated video image of an excited person, an image of a person smiling or laughing, etc) retrieved from a mood tag library 10. Software application generates and presents (to a listener) a synchronized file 6 comprising the audio (i.e., the input audio) synchronized with the associated mood based annotations.

Figure 2:
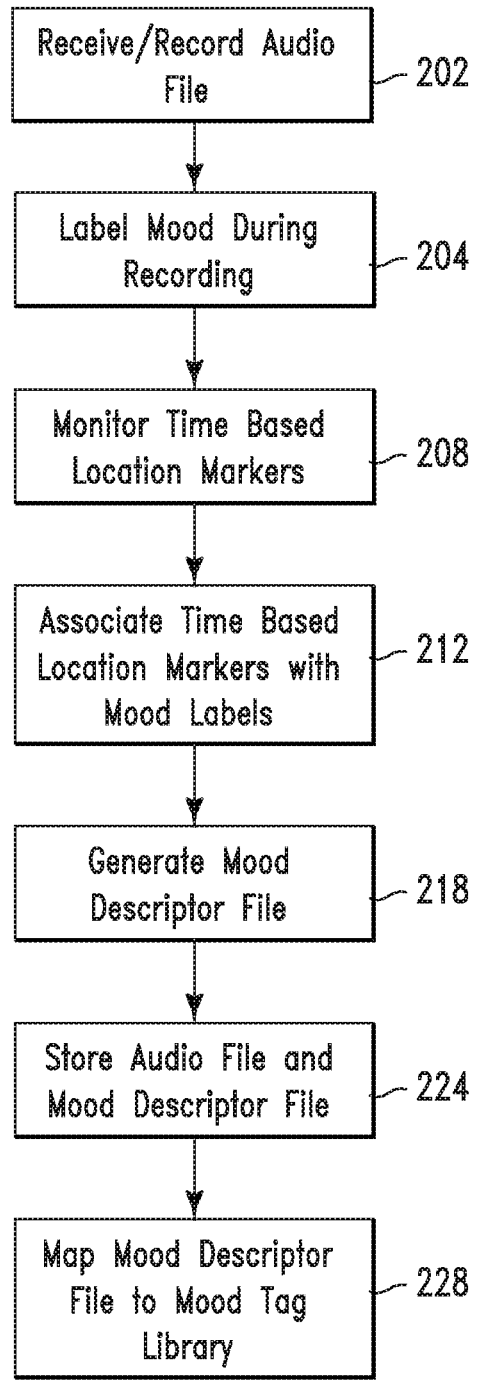
FIG. 2 illustrates a flowchart describing an algorithm used by the system of FIG. 1 for providing mood based annotations for audio media in real time during an audio recording process, in accordance with embodiments of the present invention.

FIG. 2 illustrates a flowchart describing an algorithm used by system 5 of FIG. 1 for providing mood based annotations for audio media in real time during an audio recording process, in accordance with embodiments of the present invention. In step 202, a computer processor of a computing apparatus (e.g., computing system 14 of FIG. 1) receives/records audio (i.e., speech content) from an author (or speaker) of the speech content. In step 204 (i.e., simultaneously while performing step 202), the author labels his/her moods (i.e., adds mood description labels, tags, or data to the audio) at different points during the recording process. The author may label his/her moods via an interface device such as, a hardware interface (e.g., a keyboard, switchboard, a remote computer/device, etc), a software interface (e.g., graphical user interface, a touch screen interface, etc), etc. In step 208, a software application (e.g., software 17 in FIG. 1) executed by a computer processor monitors track time based location markers (in the audio) as the author labels his/her moods. In step 212, the software application associates time frames (associated with the track time based location markers) with associated mood description labels, tags, or data. In step 218, a mood descriptor file is generated. The mood descriptor file comprises a map between portions of the audio (and/or the time frames) and specified descriptions of the mood description labels, tags, or data. In step 224, the mood descriptor file and the audio file is stored. In step 228, the mood descriptor file is mapped to associated mood based annotations from a mood tag library as described, infra with respect to FIG. 5.

Figure 3:
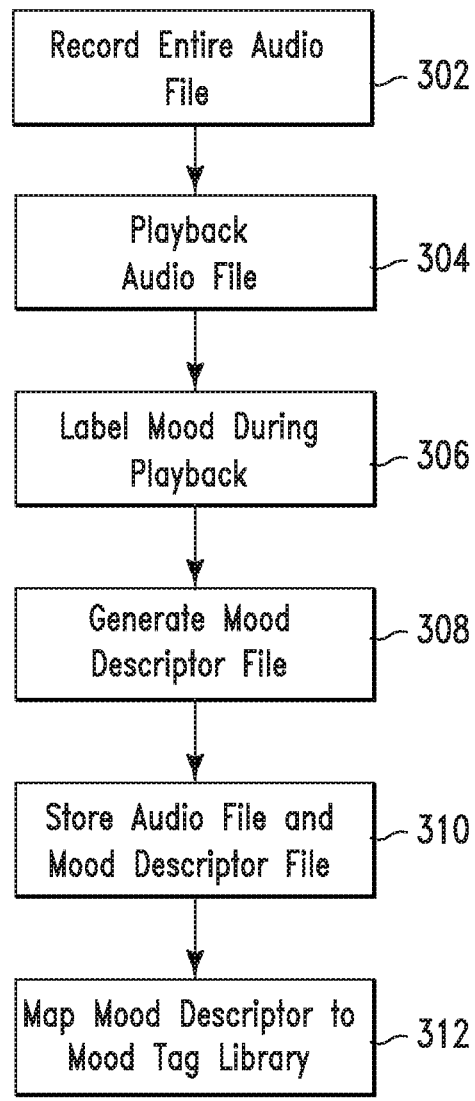
FIG. 3 illustrates a flowchart describing an algorithm used by the system of FIG. 1 for providing mood based annotations for audio media after an audio recording process, in accordance with embodiments of the present invention.

FIG. 3 illustrates a flowchart describing an algorithm used by system 5 of FIG. 1 for providing mood based annotations for audio media after an audio recording process, in accordance with embodiments of the present invention. In step 302, a computer processor of a computing apparatus (e.g., computing system 14 of FIG. 1) receives/records an entire audio file (i.e., speech content) from an author (or speaker) of the speech content. In step 304, the author enables playback of the audio file (e.g., via computing system 14 of FIG. 1). In step 306 (i.e., simultaneously during playback of the audio file), the author labels his/her moods (i.e., adds mood description labels, tags, or data to the audio) at different points in the audio file. The author may label his/her moods via an interface device such as, a hardware interface (e.g., a keyboard, switchboard, a remote computer, a remote control, etc), a software interface (e.g., graphical user interface, a touch screen interface, etc), etc. In step 308, a software application (e.g., software 17 in FIG. 1) executed by a computer processor monitors track time based location markers (in the audio) as the author labels his/her moods. Additionally, the software application associates time frames (associated with the track time based location markers) with associated mood description labels, tags, or data. A mood descriptor file is generated. The mood descriptor file comprises a map between portions of the audio (and/or the time frames) and specified descriptions of the mood description labels, tags, or data. In step 310, the mood descriptor file and the audio file is stored. In step 312, the mood descriptor file is mapped to associated mood based annotations from a mood tag library as described, infra with respect to FIG. 5.

Figure 4:
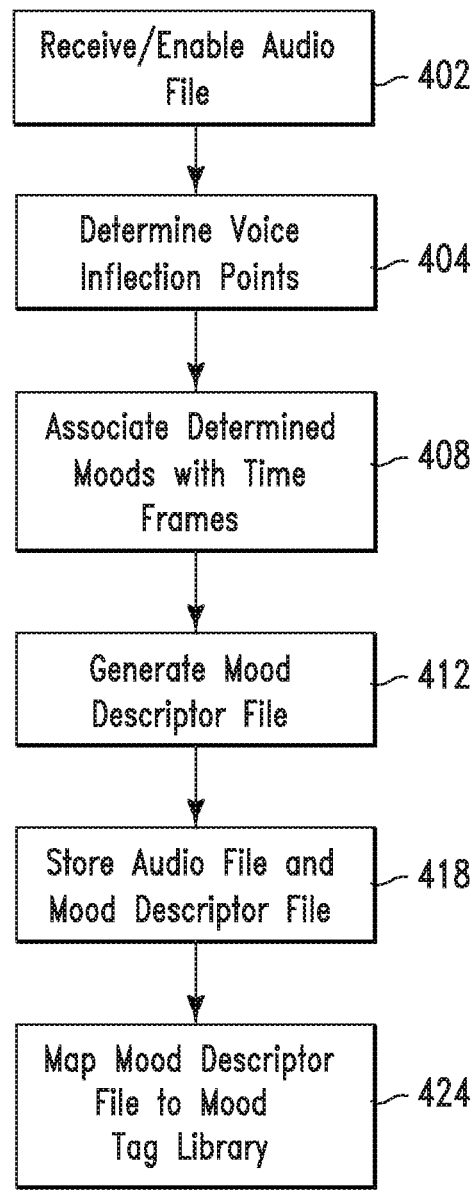
FIG. 4 illustrates a flowchart describing an algorithm used by the system of FIG. 1 for providing mood based annotations for audio media based on a voice analysis, in accordance with embodiments of the present invention.

FIG. 4 illustrates a flowchart describing an algorithm used by system 5 of FIG. 1 for providing mood based annotations for audio media based on voice analysis, in accordance with embodiments of the present invention. In step 402, a computer processor of a computing apparatus (e.g., computing system 14 of FIG. 1) receives and enables playback of audio file (e.g., via computing system 14 of FIG. 1) comprising speech content from an author (or speaker) of the speech content. In step 404 (i.e., simultaneously during playback of the audio file) voice inflection points or thresholds (in the speech content of the audio file) are determined and labeled. The voice inflection points are associated with predetermined mood description labels, tags, or data describing various moods. The voice inflection points may be associated with the predetermined mood description labels, tags, or data based on a user profile (i.e., comprising sample audio of voice inflections from the author) for the author. The user profile may include sample recordings of the author's voice. If more than one author (or speaker) is detected in the speech content, multiple user profiles (i.e., one for each author) may be used to associate voice inflection points with the predetermined mood description labels, tags, or data. In step 408, a software application (e.g., software 17 in FIG. 1) executed by a computer processor monitors track time based location markers (in the audio) as the voice inflection points or thresholds are labeled. Additionally, the software application associates time frames (associated with the track time based location markers) with associated mood description labels, tags, or data. In step 412, a mood descriptor file is generated. The mood descriptor file comprises a map between portions of the audio (and/or the time frames) and specified descriptions of the mood description labels, tags, or data. In step 418, the mood descriptor file and the audio file is stored. In step 424, the mood descriptor file is mapped to associated mood based annotations from a mood tag library as described, infra with respect to FIG. 5.

Figure 5:
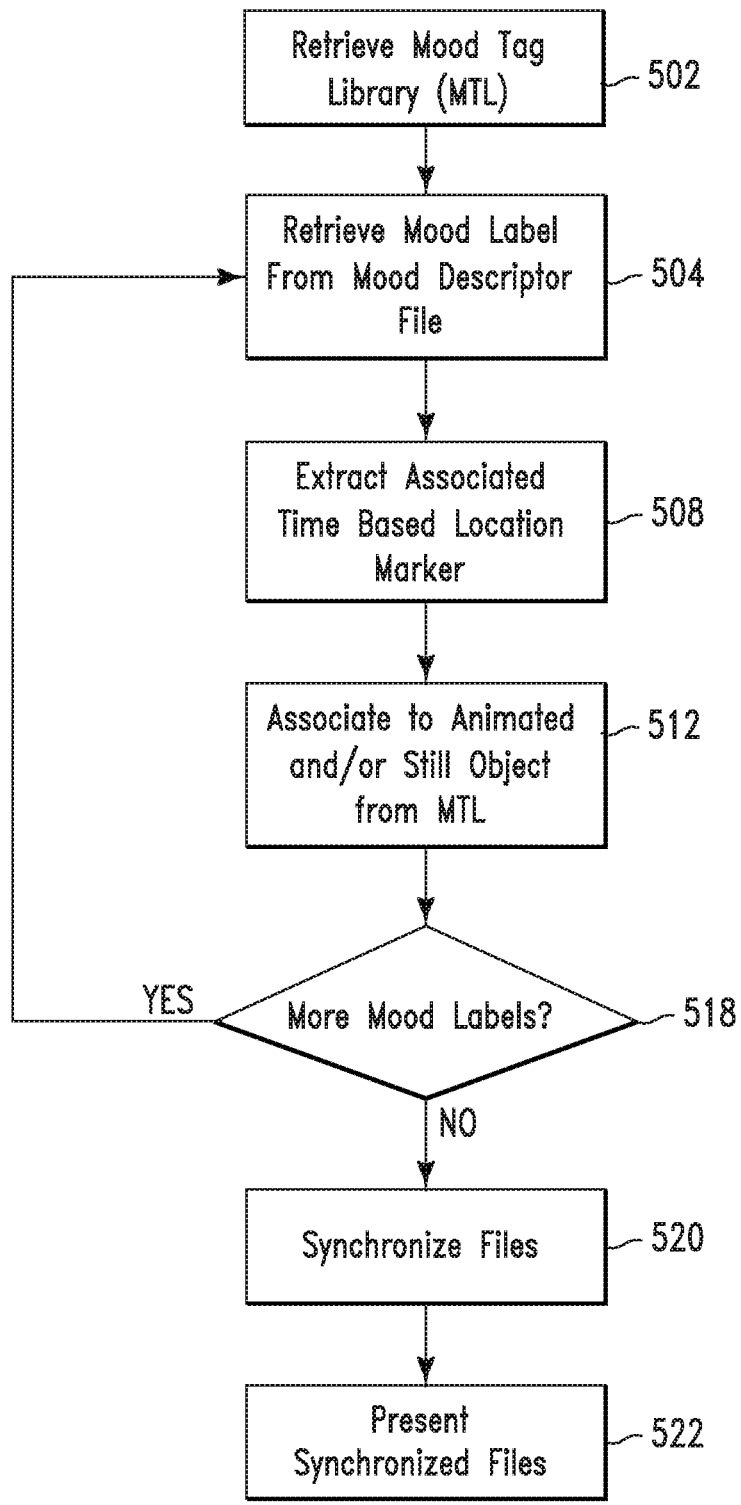
FIG. 5 illustrates a flowchart detailing a mapping process of FIGS. 2-5, in accordance with embodiments of the present invention.

FIG. 5 illustrates a flowchart detailing steps 228, 312, and 424 of FIGS. 2-5, in accordance with embodiments of the present invention. In step 502, the computer processor retrieves a mood tag library comprising animated and/or still video objects representing various emotions/moods. The mood tag library may be provided by the author of the audio file or may be provided by a third party. In step 504, a mood tag or label is retrieved from the mood descriptor file. In step 508, a track time based location marker (i.e., associated with the mood tag or label) is extracted from the mood descriptor file. In step 512, the extracted track time based location marker (associated with the mood tag or label) is associated to an applicable animated and/or still video object from the mood tag library. In step 518, it is determined if there are any more mood tags or labels in the mood descriptor file. If it is determined that there are more mood tags or labels in the mood descriptor file then steps 504-518 are repeated until all track time based location markers (associated with mood tags or labels) are associated to an applicable animated and/or still video object from the mood tag library. If it is determined that there are no more mood tags or labels in the mood descriptor file then in step 520, the animated or still objects are synchronized with associated portions of (i.e., specified speech in) the audio file. In step 522, the synchronized files are presented to a listener. Additionally, specified video and/or audio messages may be presented to the listener (at various intervals during presenting the synchronized files). Subsequently, (after the synchronized files are presented) questions associated with the specified video and/or audio messages (or the audio data) are presented to the user. Responses (from the listener) are used to determine if the user has listened to all of the audio data.

Figure 6:
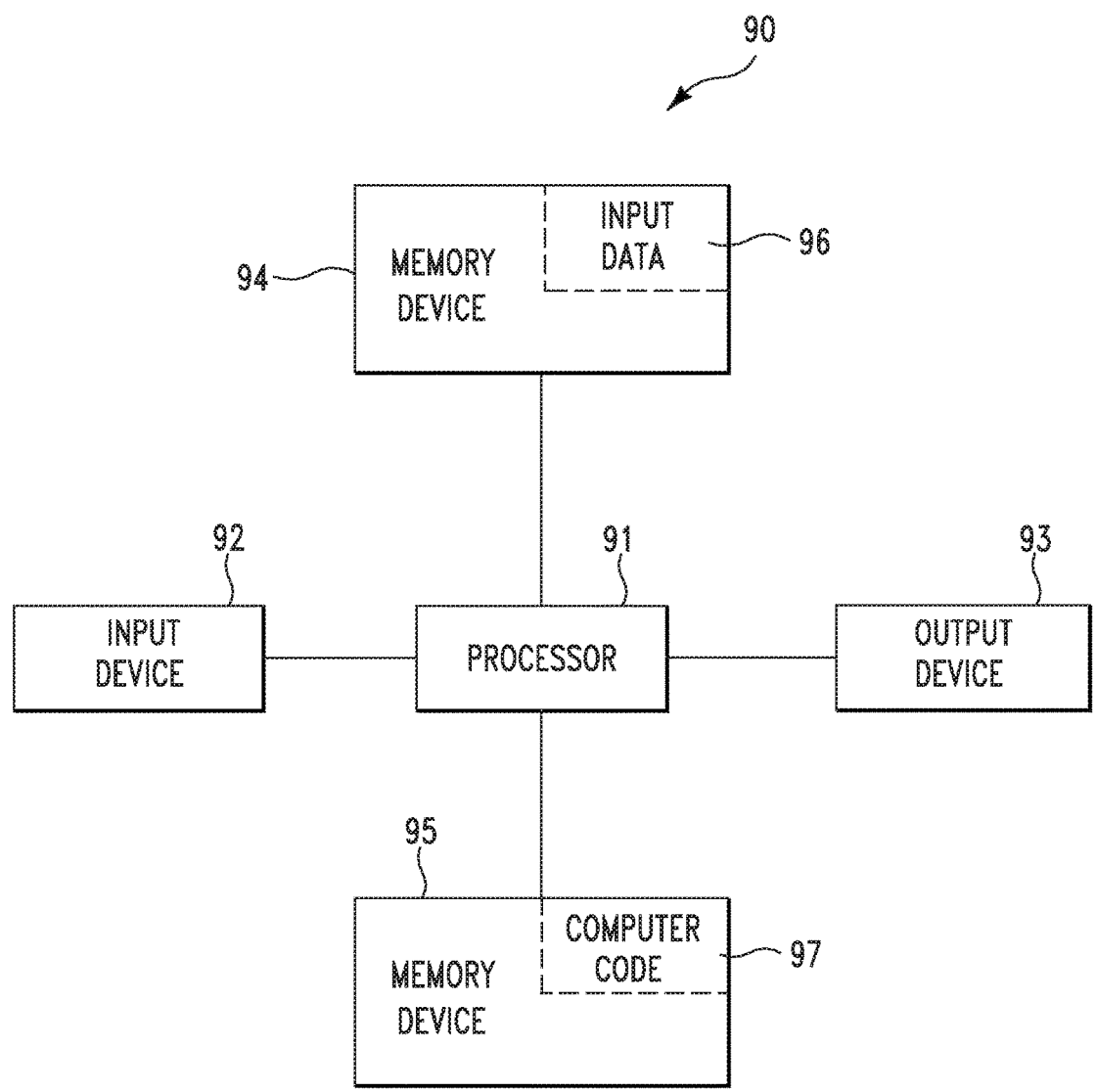
FIG. 6 illustrates a computer apparatus used for providing mood based annotations for audio media, in accordance with embodiments of the present invention.

FIG. 6 illustrates a computer apparatus 90 (e.g., computing system 14 of FIG. 1) used for providing mood based annotations for audio media, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-5) for providing mood based annotations for audio media. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 2-5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to provide mood based annotations for audio media. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for providing mood based annotations for audio media. In another embodiment, the invention provides a business method that performs the process steps of the invention on a subscription, advertising, and/or fee basis. That is, a service supplier, such as a Solution Integrator, could offer to provide mood based annotations for audio media. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The claims are as follows:

1. A method comprising:
   generating, by a computer processor of a computing apparatus, a mood descriptor file comprising portions of an audio file comprising audio data presented by an author, wherein said audio data is associated with specified descriptions of mood description data describing different human emotions/moods;
   receiving, by said computer processor, a mood tag library file comprising mood tags describing and mapped to mood based annotations comprising animated video images representing various emotions/moods;
   associating, by said computer processor based on said mood tags, each animated video image of said animated video images with an associated description of said specified descriptions;
   synchronizing, by said computer processor based on results of said associating, said animated video images with said portions of said audio data associated with said specified descriptions;
   first presenting, by said computer processor to a listener, said animated video images synchronized with said portions of said audio data associated with said specified descriptions;
   third presenting, by said computer processor to said listener after completion of said first presenting and second presenting specified video and/or audio messages to said listener at various intervals during said first presenting, questions associated with said specified video and/or audio messages; and
   determining, by said computer processor based on responses to said questions from the listener, if said listener has listened to all of said portions of said audio data.

2. The method of claim 1, wherein said generating said mood descriptor file comprises:
   during said receiving said audio file, receiving from said author, commands at specific time points with respect to said receiving, said commands indicating various moods of said author; and
   associating said commands with said specified descriptions, wherein said mood descriptor file comprises said portions of said audio data associated with said specified descriptions at said specific time points.

3. The method of claim 2, wherein said commands are received via an interface selected from the group consisting of a hardware interface and a software interface.

4. The method of claim 1, wherein said generating said mood descriptor file comprises:
   presenting to said author, said audio file;
   during said presenting said audio file, receiving from said author, commands at specific time points with respect to said presenting, said commands indicating various moods of said author; and
   associating said commands with said specified descriptions, wherein said mood descriptor file comprises said portions of said audio data associated with said specified descriptions at said specific time points.

5. The method of claim 4, wherein said commands are received remotely via an external interface.

6. The method of claim 1, wherein said generating said mood descriptor file comprises:
   determining voice inflection points within said audio file;
   associating time intervals at various points of said audio file with said voice inflection points;
   associating said voice inflection points with various moods of said author; and
   associating said various moods of said author with said specified descriptions, wherein said mood descriptor file comprises said portions of said audio data associated with said specified descriptions at associated time intervals of said time intervals of said audio file.

7. The method of claim 6, further comprising:
associating voice inflection thresholds with said voice inflection points within said audio file, wherein said associating said various moods of said author with said specified descriptions is based on said voice inflection thresholds.

8. The method of claim 6, further comprising:
associating a user profile for said author with said voice inflection points within said audio file, wherein said user profile comprises sample recordings of said authors voice, and wherein said associating said various moods of said author with said specified descriptions is based on said user profile.

9. The method of claim 1, wherein results of said determining indicates that said listener has listened to all of said portions of said audio data, and wherein said method further comprises:
transmitting, by said computer processor to an administrator, a message indicating that said listener has listened to all of said portions of said audio data.

10. The method of claim 1, wherein results of said determining indicates that said listener has not listened to all of said portions of said audio data, and wherein said method further comprises:
transmitting, by said computer processor to an administrator, a message indicating that said listener has not listened to all of said portions of said audio data; and
additionally presenting, by said computer processor to said listener, said animated and/or still objects synchronized with said portions of said audio data associated with said specified descriptions.

11. The method of claim 1, wherein the mood tag library file is received from a library selected from the group consisting of a listener library defined by said listener, a third party defined library, an author library defined by said author, and combinations thereof.

12. The method of claim 1, further comprising:
providing a process for supporting computer infrastructure, said process comprising providing at least one support service for at least one of creating, integrating, hosting, maintaining, and deploying computer-readable code in the computing apparatus, wherein the code in combination with the computing apparatus is configured to perform the method of claim 1.

13. A computing system comprising a computer processor coupled to a computer-readable memory unit, said memory unit comprising instructions that when executed by the computer processor implements a method comprising:
generating, by said computer processor, a mood descriptor file comprising portions of an audio file comprising audio data presented by an author, wherein said audio data is associated with specified descriptions of mood description data describing different human emotions/moods;
receiving, by said computer processor, a mood tag library file comprising mood tags describing and mapped to mood based annotations comprising animated video images representing various emotions/moods;
associating, by said computer processor based on said mood tags, each animated video image of said animated video images with an associated description of said specified descriptions;
synchronizing, by said computer processor based on results of said associating, said animated video images with said portions of said audio data associated with said specified descriptions;
first presenting, by said computer processor to a listener, said animated video images synchronized with said portions of said audio data associated with said specified descriptions;
third presenting, by said computer processor to said listener after completion of said first presenting and second presenting specified video and/or audio messages to said listener at various intervals during said first presenting, questions associated with said specified video and/or audio messages; and
determining, by said computer processor based on responses to said questions from the listener, if said listener has listened to all of said portions of said audio data.

14. The computing system of claim 13, wherein said wherein said generating said mood descriptor file comprises:
during said receiving said audio file, receiving from said author, commands at specific time points with respect to said receiving, said commands indicating various moods of said author; and
associating said commands with said specified descriptions, wherein said mood descriptor file comprises said portions of said audio data associated with said specified descriptions at said specific time points.

15. The computing system of claim 14, wherein said commands are received via an interface selected from the group consisting of a hardware interface and a software interface.

16. The computing system of claim 13, wherein said generating said mood descriptor file comprises:
presenting to said author, said audio file;
during said presenting said audio file, receiving from said author, commands at specific time points with respect to said presenting, said commands indicating various moods of said author; and
associating said commands with said specified descriptions, wherein said mood descriptor file comprises said portions of said audio data associated with said specified descriptions at said specific time points.

17. The computing system of claim 16, wherein said commands are received remotely via an external interface.

18. The computing system of claim 13, wherein said generating said mood descriptor file comprises:
determining voice inflection points within said audio file;
associating time intervals at various points of said audio file with said voice inflection points;
associating said voice inflection points with various moods of said author; and
associating said various moods of said author with said specified descriptions, wherein said mood descriptor file comprises said portions of said audio data associated with said specified descriptions at associated time intervals of said time intervals of said audio file.

19. A computer program product, comprising a computer readable storage device storing a computer readable program code, said computer readable program code comprising an algorithm that when executed by a computer processor of a computing system implements a method, said method comprising:
generating, by said computer processor, a mood descriptor file comprising portions of an audio file comprising audio data presented by an author, wherein said audio data is associated with specified descriptions of mood description data describing different human emotions/moods;

receiving, by said computer processor, a mood tag library file comprising mood tags describing and mapped to mood based annotations comprising animated video images representing various emotions/moods;

associating, by said computer processor based on said mood tags, each animated video image of said animated video images with an associated description of said specified descriptions;

synchronizing, by said computer processor based on results of said associating, said animated video images with said portions of said audio data associated with said specified descriptions;

first presenting, by said computer processor to a listener, said animated video images synchronized with said portions of said audio data associated with said specified descriptions;

third presenting, by said computer processor to said listener after completion of said first presenting and second presenting specified video and/or audio messages to said listener at various intervals during said first presenting, questions associated with said specified video and/or audio messages; and determining, by said computer processor based on responses to said questions from the listener, if said listener has listened to all of said portions of said audio data.

20. The computer program product of claim 19, wherein said wherein said generating said mood descriptor file comprises:

during said receiving said audio file, receiving from said author, commands at specific time points with respect to said receiving, said commands indicating various moods of said author; and associating said commands with said specified descriptions, wherein said mood descriptor file comprises said portions of said audio data associated with said specified descriptions at said specific time points.

* * * * *